United States Patent
Laurent et al.

(10) Patent No.: US 7,165,640 B2
(45) Date of Patent: Jan. 23, 2007

(54) TRACTION CHAIN COMPRISING A GEAR MECHANISM INTEGRATED IN A WHEEL

(75) Inventors: Daniel Laurent, Marly (CH); David Olsommer, Fribourg (CH); Pierre Varenne, Neyrus (CH); Pierre-Alain Magne, Belfaux (CH)

(73) Assignee: Conception et Developpement Michelin, Givisiez (CH)

( * ) Notice: Subject to any disclaimer, the term of this patent is extended or adjusted under 35 U.S.C. 154(b) by 87 days.

(21) Appl. No.: 10/617,680

(22) Filed: Jul. 14, 2003

(65) Prior Publication Data

US 2004/0007406 A1    Jan. 15, 2004

(30) Foreign Application Priority Data

Jul. 15, 2002    (FR)    ............................. 02 08930

(51) Int. Cl.
B60K 1/00    (2006.01)
(52) U.S. Cl. .................................. 180/65.5; 180/65.6
(58) Field of Classification Search ............... 180/65.1, 180/65.5, 65.6, 65.7, 197, 245, 247; 701/51, 701/53; 74/664, 321, 810.1
See application file for complete search history.

(56) References Cited

U.S. PATENT DOCUMENTS

| | | | |
|---|---|---|---|
| 1,481,706 A * | 1/1924 | Goodwin | 74/321 |
| 3,930,551 A * | 1/1976 | Cragg | 180/65.6 |
| 4,083,421 A * | 4/1978 | Van Horn et al. | 180/369 |
| 4,094,556 A * | 6/1978 | Okamoto et al. | 303/196 |
| 4,899,279 A * | 2/1990 | Cote et al. | 701/37 |
| 5,033,571 A * | 7/1991 | Morimoto | 180/176 |
| 5,038,633 A * | 8/1991 | Igarashi et al. | 74/664 |
| 5,322,141 A * | 6/1994 | Brunner et al. | 180/65.5 |
| 5,780,979 A * | 7/1998 | Kim | 318/15 |
| 5,813,488 A | 9/1998 | Weiss | |
| 6,511,397 B1 * | 1/2003 | Glab et al. | 477/36 |

FOREIGN PATENT DOCUMENTS

| | | |
|---|---|---|
| DE | 197 23 776 A1 | 12/1997 |
| EP | 0 700 805 A2 | 3/1996 |

* cited by examiner

*Primary Examiner*—Frank Vanaman
(74) *Attorney, Agent, or Firm*—Buchanan Ingersoll & Rooney PC

(57) ABSTRACT

Traction chain for an automobile vehicle including a wheel support (K) which supports a rotating hub designed to receive a drive wheel (W), and a rotating toothed wheel having the same rotation axis as that of the drive wheel, the toothed wheel meshing directly with the hub. At least two gear-wheels are permanently engaged with the toothed wheel and are rotated by an input shaft that is driven by an electric motor. A gear ratio change shifter mechanism is shiftable between first and second driving positions and a neutral non-driving position. In the first driving position the shifter mechanism directly connects the input shaft with one of the gear-wheels. In the second driving position the shifter mechanism indirectly connects the input shaft with the other gear-wheel through a transmission path which establishes a gear reduction ratio different from the gear ratio established by the direct connection.

9 Claims, 9 Drawing Sheets

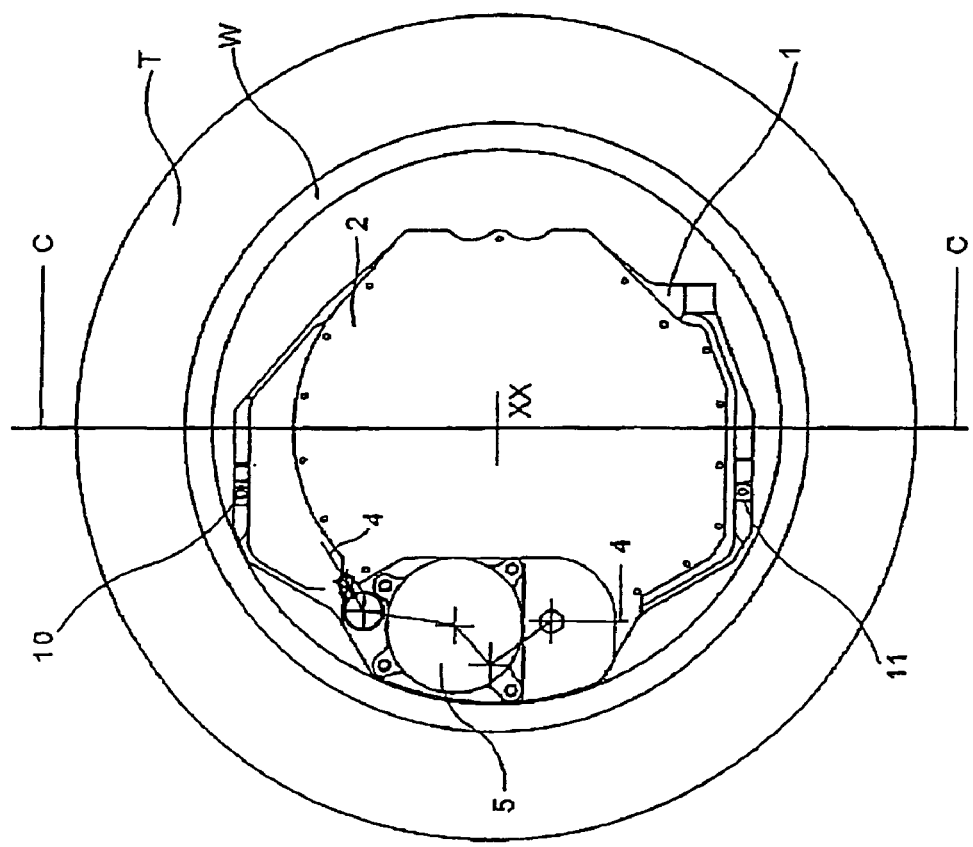
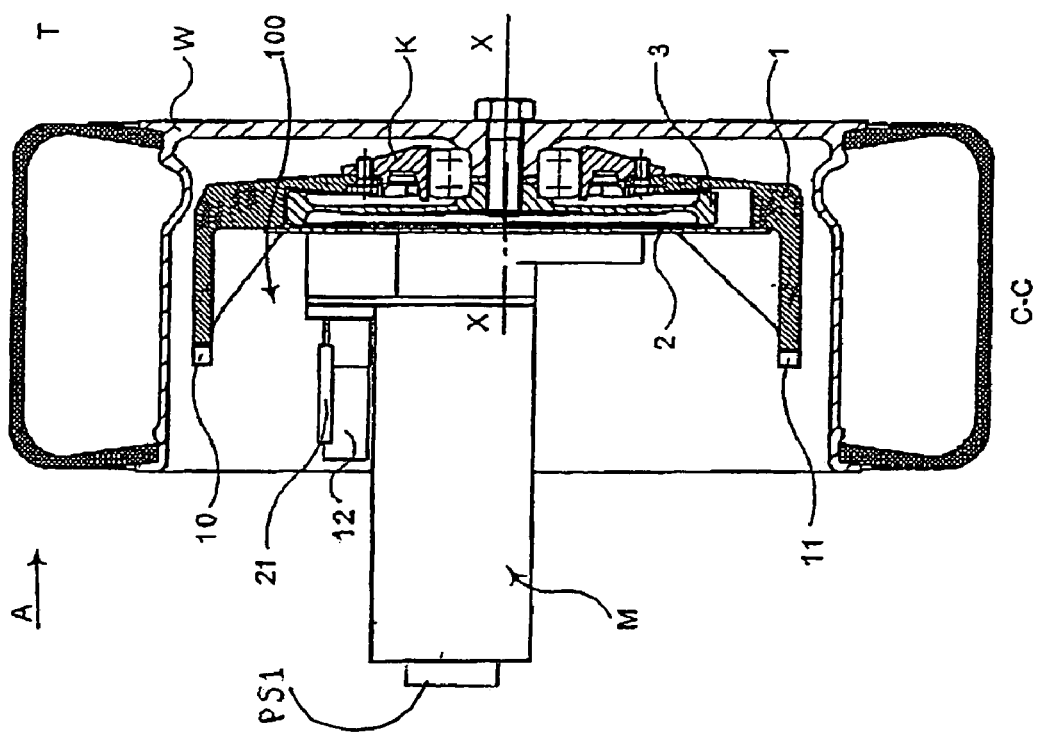

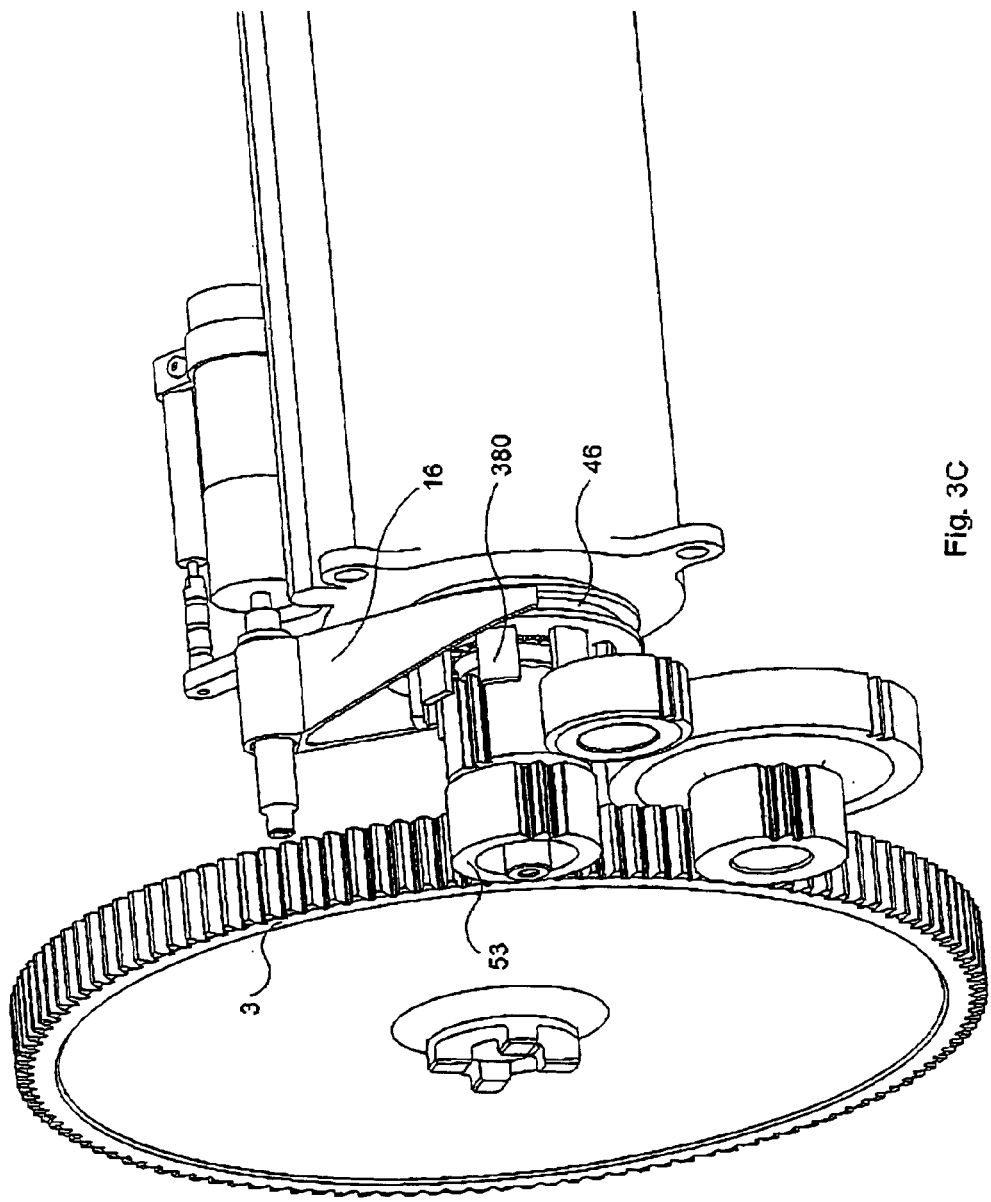

TRACTION CHAIN COMPRISING A GEAR MECHANISM INTEGRATED IN A WHEEL

BACKGROUND

The present invention concerns automobile vehicles with electric traction. It concerns both purely electric vehicles and vehicles of the hybrid type, in particular vehicles of the hybrid series type.

In some of the versions referred to above, the drive wheel(s) of these vehicles is/are only powered by an electric motor. In this case it is imaginable to integrate an electric traction motor directly in a wheel rather than to install it on the chassis of the vehicle, which allows the transmission shaft to be omitted. Besides, one of the advantages of electric traction as such relates to the constant nature of the torque that can be developed by an electric motor over the whole range of its rotation speed.

Of course, to obtain the full benefit of the configuration mentioned (built in electric traction motor), it is desirable to be able to make wheel and motor assemblies which are as compact and light as possible. In particular, it is desirable for the traction chain as such, going from the electric motor to the wheel, to be as light and compact as possible, all the more since the masses in question are unsuspended.

It has already been mentioned that electric motors can develop fairly large torques which are substantially constant over the whole range of their rotation speed. However, it is also known that the bulk of an electric motor is essentially proportional to the torque it is designed to deliver. In addition, to provide a torque on the wheel which is as large as possible while having a very compact electric drive motor, it is desirable to install an as large as possible total reduction ratio between the shaft of the electric motor and the axle of the wheel.

If the total reduction ratio installed between the shaft of the electric motor and the wheel axle is increased, the motor speed at the maximum speed of the vehicle also increases. Now, the mechanical and electrical stresses undergone by an electric motor increase markedly with its rotation speed. If an upper limit is set on the rotation speed of the electric motor, it may be desirable to provide a choice of total reduction ratios between the electric motor and the wheel. Thus, it is also necessary to integrate in the wheel a gear ratio change mechanism that enables either a large torque to be obtained at the wheel, or the maximum speed of the vehicle to be attained.

This raises the problem of as compact as possible a design of such a gear ratio change mechanism, to avoid ending up with a solution which, overall (i.e. taking the electric motor and the gear ratio change mechanism together), is bulkier and heavier than an electric motor in direct engagement, sized so that it can develop on the wheel axle the maximum torque desired while increasing the final reduction ratio. It is also necessary to design a control system which enables the change from one gear ratio to the other to take place as simply and quickly as possible. And the means required for changing from one gear ratio to the other must not increase the weight of the transmission chain as a whole.

SUMMARY OF THE INVENTION

The invention proposes a traction chain for a vehicle comprising:
a wheel support carrying a rotating hub designed to receive a drive wheel and having a rotation axis for the said drive wheel,
a rotating toothed wheel having the same rotation axis as that of the said drive wheel, the toothed wheel meshing directly with the hub,
an arrangement comprising at least two gear-wheels which engage permanently with the said toothed wheel, comprising an input shaft designed to be coupled with the shaft of an electric motor, and comprising a gear change mechanism with a neutral position between ratios, the said mechanism comprising a direct mesh between the input shaft and one of the gear-wheels, the said mechanism comprising, between the input shaft and the other gear-wheel, at least one other mechanical transmission path with a different reduction ratio from the direct mesh.

In a particularly advantageous embodiment, the invention proposes a gear ratio change mechanism comprising a dog clutch which enables one or other of the ratios to be selected. Advantageously, the said mechanism has no friction clutch at all. In other words, it only comprises means for positive mechanical engagement. In addition and preferably, the invention uses a brushless synchronous self-adjusting type motor which, by its nature, comprises a rotor position sensor. The invention uses only this rotor position sensor of the motor and a sensor assembly associated with the gear ratio change mechanism to determine the rotation speed of the wheel in question and to effect all the gear ratio changes required. Preferably, the arrangement only comprises two gear ratios.

BRIEF DESCRIPTION OF THE DRAWINGS

A preferred embodiment of the invention is illustrated in the attached figures, in which:

FIG. 1 shows a wheel of the vehicle, in which the electric traction chain of the invention is integrated, viewed in section along line C/C indicated in FIG. 2;

FIG. 2 is a view in the direction A in FIG. 1;

FIGS. 3A, 3B and 3C are partial perspective views showing the electromechanical transmission chain;

DETAILED DESCRIPTION OF PREFERRED EMBODIMENT

Figure 3A:
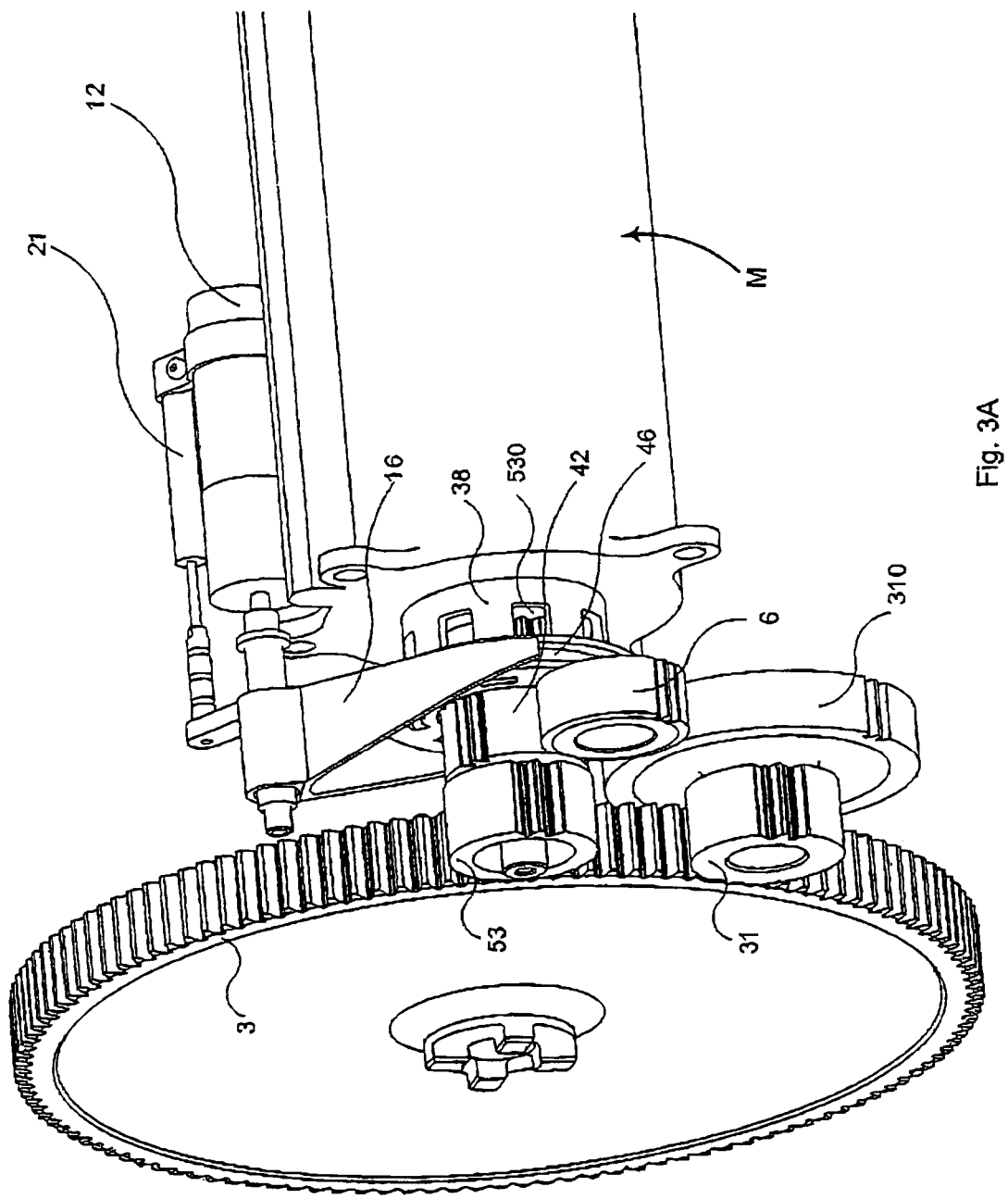

FIGS. 1 and 2 show a wheel W on which is fitted a tire T. The wheel is mounted to rotate on a wheel support K, the axis XX being its rotation axis. There is also a housing 1 closed by a cover 2 and by the stator portion 5 of an electric traction motor M. The housing 1 comprises an upper extension 10 and a lower extension 11 to whose ends can be attached a suspension system for the wheel W relative to a chassis or the body of the vehicle. Here, only the so-termed unsuspended elements of a ground contact system for an automobile vehicle are shown.

Together with the cover 2 and the electric motor M, the housing 1 delimits a closed space. This closed space can contain the quantity of oil needed to lubricate the mechanical elements inside it. Inside the housing 1 there is a toothed wheel 3 (see FIG. 1 and FIGS. 3) which rotates about the axis XX in direct engagement with the wheel W.

Figure 4A:
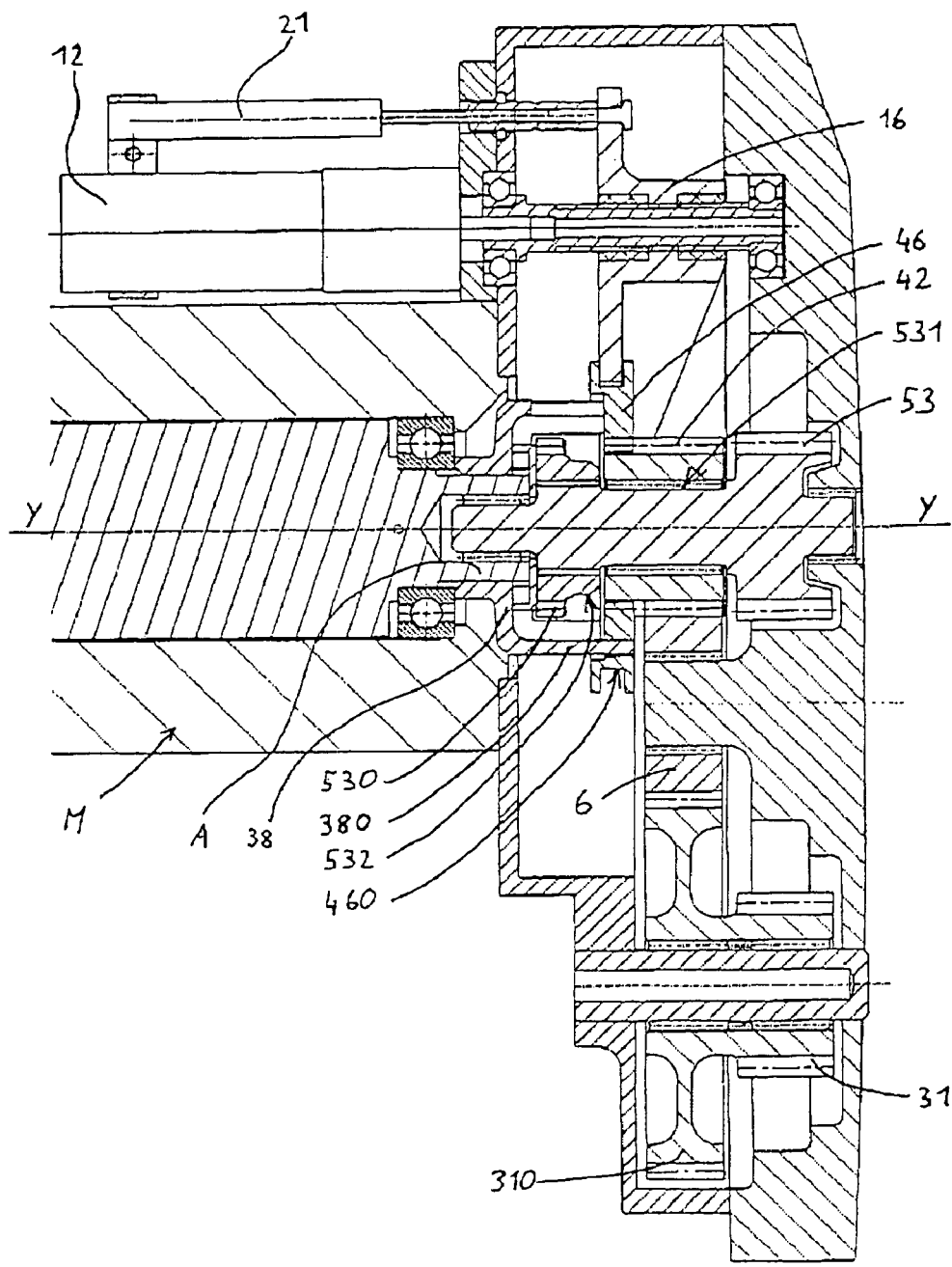
FIGS. 4A, 4B and 4C are sections along 4/4 in FIG. 2, showing the essential elements of the gear ratio change mechanism with two ratios.

FIG. 3A shows that the toothed wheel 3 meshes with a first gear wheel 31. The first gear wheel 31 is coaxial with and attached to an auxiliary gear wheel 310 with a diameter larger than that of the first gear wheel 31. The first gear wheel 31 and the auxiliary gear wheel 310 form one and the same monoblock rotating mechanical component (see FIG. 4A). The auxiliary gear wheel 310 meshes with an intermediate gear wheel 6. The gear wheel 6 enables the same rotation directions of the electric motor to be maintained regardless of which ratio is engaged.

Besides, the toothed wheel 3 meshes with a second gear wheel 53. The second gear wheel 53 is coaxial with and attached to a gear-wheel 530 which can be controlled by a dog clutch (see in particular FIGS. 3A and 4A). The second gear wheel 53 and the controllable gear wheel 530 form a single, monoblock rotating mechanical component. This mechanical component comprises a peripheral disengagement zone 532 with no teeth, adjacent to the controllable gear wheel 530 (see in particular FIG. 4A). This mechanical component also comprises a smooth intermediate section 531. An idle gear wheel 42 that can be controlled by a dog clutch is fitted on the smooth intermediate section 531 coaxially with the secondary gear wheel 53, so that it can rotate freely relative to the secondary gear-wheel 53.

The gear change shifter mechanism comprises a dog clutch 46 which enables a gear ratio to be selected. In the illustrated embodiment, the dog clutch 46 comprises inner teeth which match the (outer) teeth of the controllable gear wheel 530 and of the controllable idle gear wheel 42. The dog clutch 46 can engage either with the controllable idle gear-wheel 42 to give a reduction ratio (FIGS. 3A and 4A), or with the controllable gear-wheel 530 to give direct meshing (FIGS. 3C and 4C), or else the dog clutch 46 can be moved to a disengaged position in which its inner teeth are opposite the disengagement zone 532 free from any teeth (FIGS. 3B and 4B).

Figure 4B:
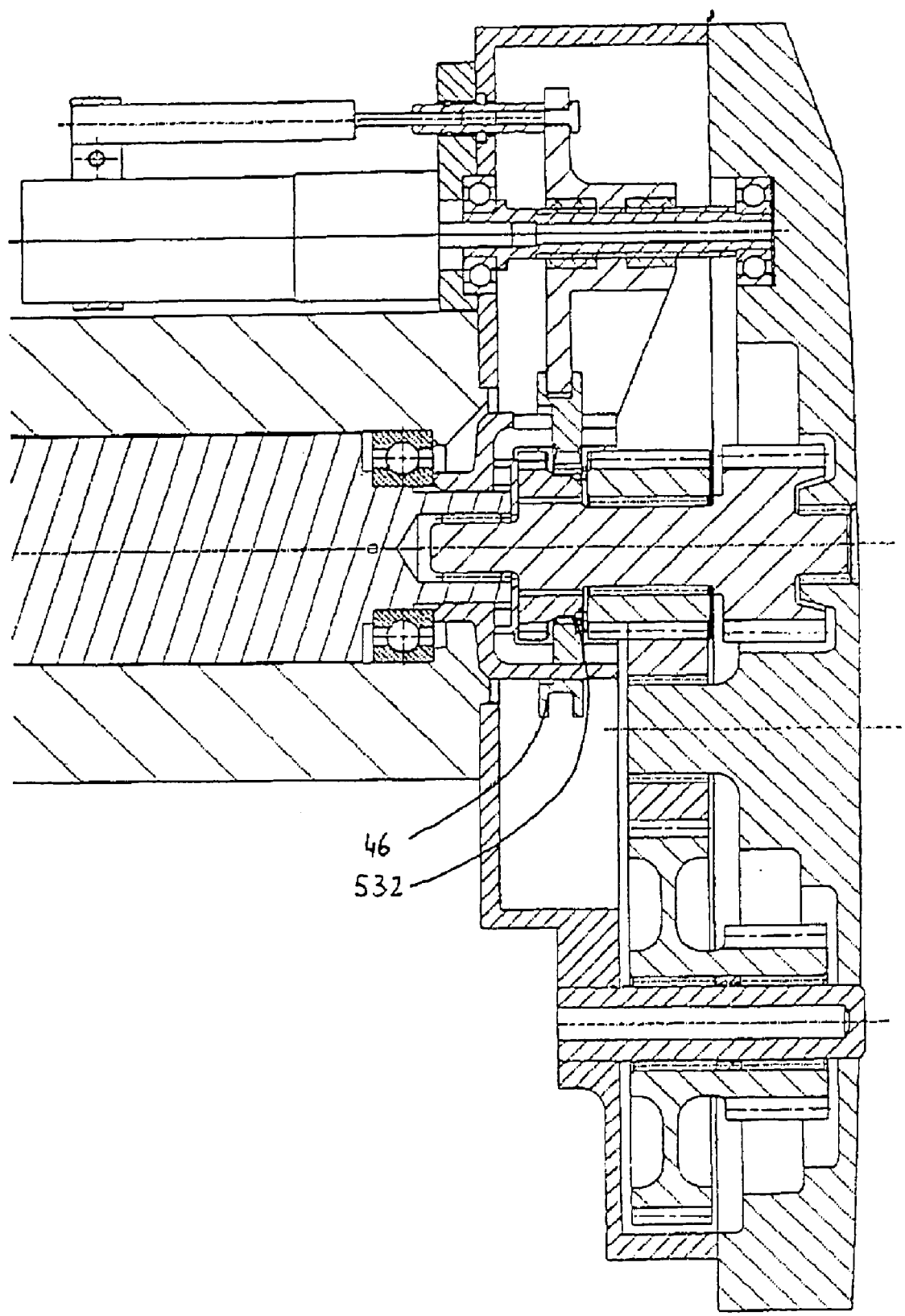
Figure 4C:
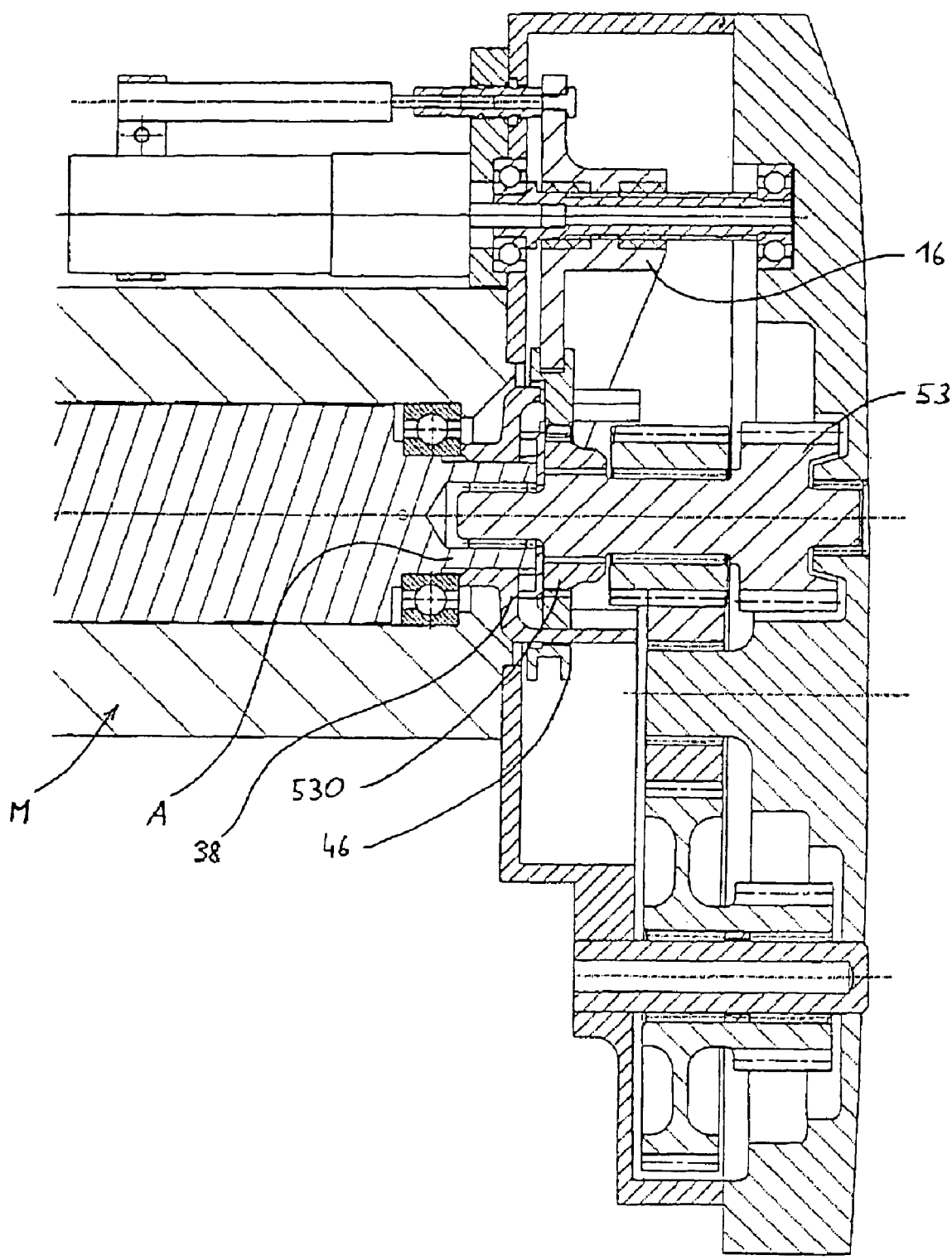
Figure 5:
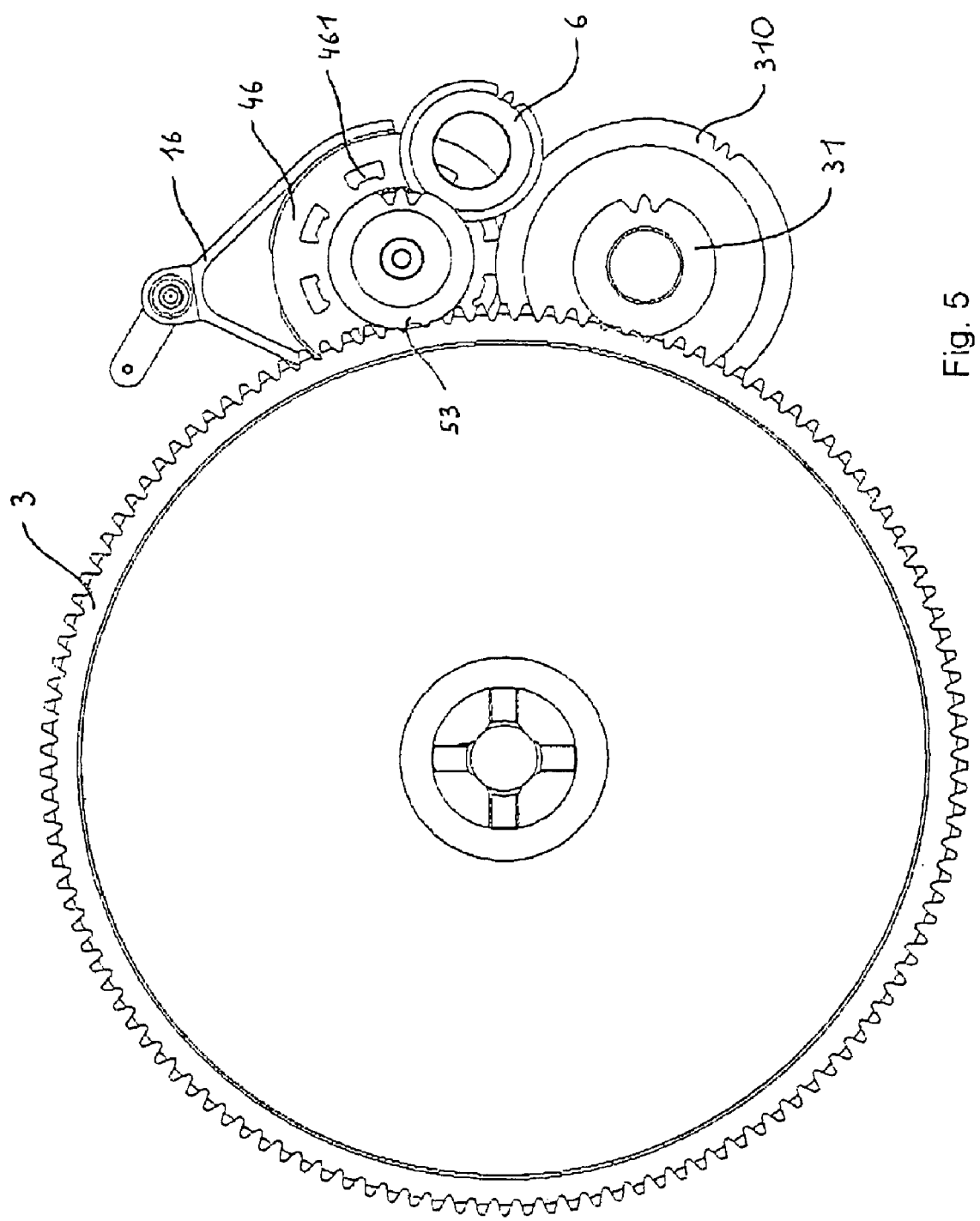
FIG. 5 is a partial view of the electromechanical transmission chain.

Besides, the dog clutch 46 comprises an external peripheral neck 460 and recesses 461 (see FIG. 5). The end of an input shaft A of the rotor of the electric motor M can be seen (FIGS. 4), YY being the rotation axis of the shaft A. A clutch basket 38 is attached to the shaft A of the electric motor M. The dog clutch 46 is centered by the clutch basket 38. A fork 16 is engaged radially on the outside in the peripheral neck 460 formed on the dog clutch 46. The clutch basket 38 comprises fingers 380 engaged in the recesses 461 of the dog clutch 46. The dog clutch 46 can slide axially relative to the clutch basket, while being rotationally fixed with respect to it.

Figure 3B:
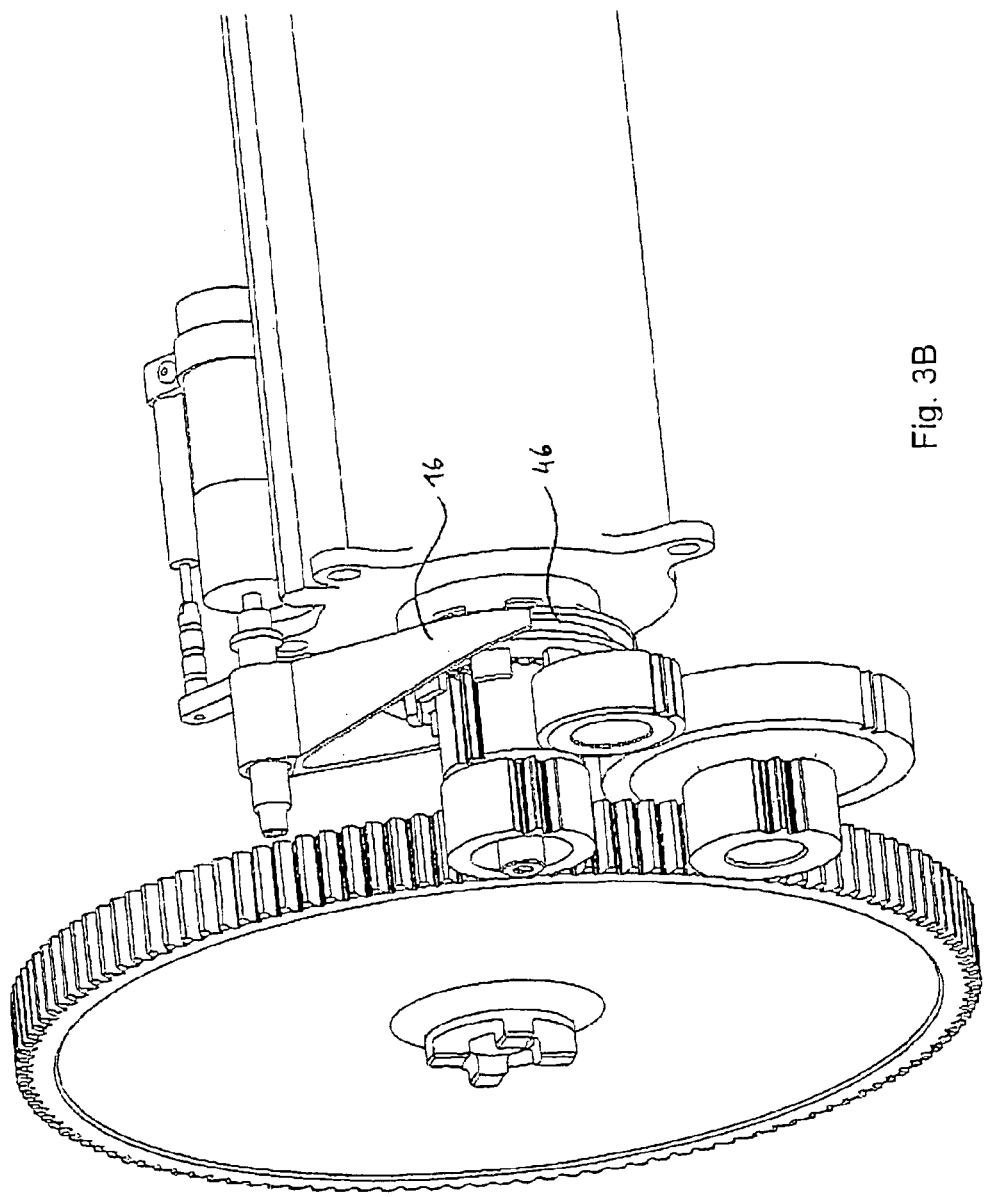

The fork 16 is controlled by a motorized reduction unit 12. A position detector 21 is connected to the fork 16. The dog clutch 46 can have three positions:

- a position in which the dog clutch 46 moves the toothed wheel via an intermediate gearwheel 6 which enables the rotation speed to be inverted; the dog clutch 46 is then coupled with the idle gear-wheel 42 and therefore indirectly connects the input shaft A with the auxiliary gear-wheel 310 and the first gear-wheel 31 via the intermediate gear-wheel 6 (see in particular FIGS. 3A and 4A); this is the aforesaid other mechanical transmission path;
- a position in which it directly connects the input shaft with the auxiliary gear-wheel 530 and thus directly with the second gear-wheel 53 (see in particular FIGS. 3C and 4C);
- a neutral intermediate position, shown in FIGS. 3B and 4B.

The first gear wheel 31 and the second gear wheel 53 are permanently driven by the toothed wheel 3. Since they have identical teeth, they both rotate at the same angular velocity. When the second gear-wheel 53 is engaged with the shaft A of the rotor of the electric motor M via the second auxiliary gear-wheel 530, the dog clutch 46 and the clutch basket 38, it is directly meshed with the motor M. On the other hand, when the traction torque is transmitted by the first gear-wheel 31 via the clutch basket 38, the dog clutch 46, the idle gear-wheel 42, the intermediate gear-wheel 6 and the auxiliary gear-wheel 310, there is between the shaft A of the rotor of the electric motor M and the first gear-wheel 31 a reduction ratio which corresponds to the ratio R between the number of teeth on the auxiliary gear-wheel 310 and the number of teeth on the idle gear-wheel 42.

Note also that in the said other mechanical transmission path, the dog clutch moves the toothed wheel 3 via an intermediate gear-wheel 6 that enables the rotation speed to be inverted. Thus, the gear wheel 6 enables the same rotation direction of the electric motor to be maintained regardless of the gear engaged: direct meshing, or other mechanical transmission path. As a variant (not illustrated in the figures), the electric motor could just as well run in opposite rotation directions for one gear ratio and for the other gear ratio; in this variant there would be no intermediate gear-wheel in the said other mechanical transmission path for inverting the rotation direction.

A gear change results in a virtually instantaneous and large change of the speed of the electric traction motor. When the vehicle is equipped with several drive wheels each fitted with an electric motor and gearbox assembly according to the invention, the change can for example take place synchronously, at least in wheels on the same axle of the vehicle.

Figure 6:
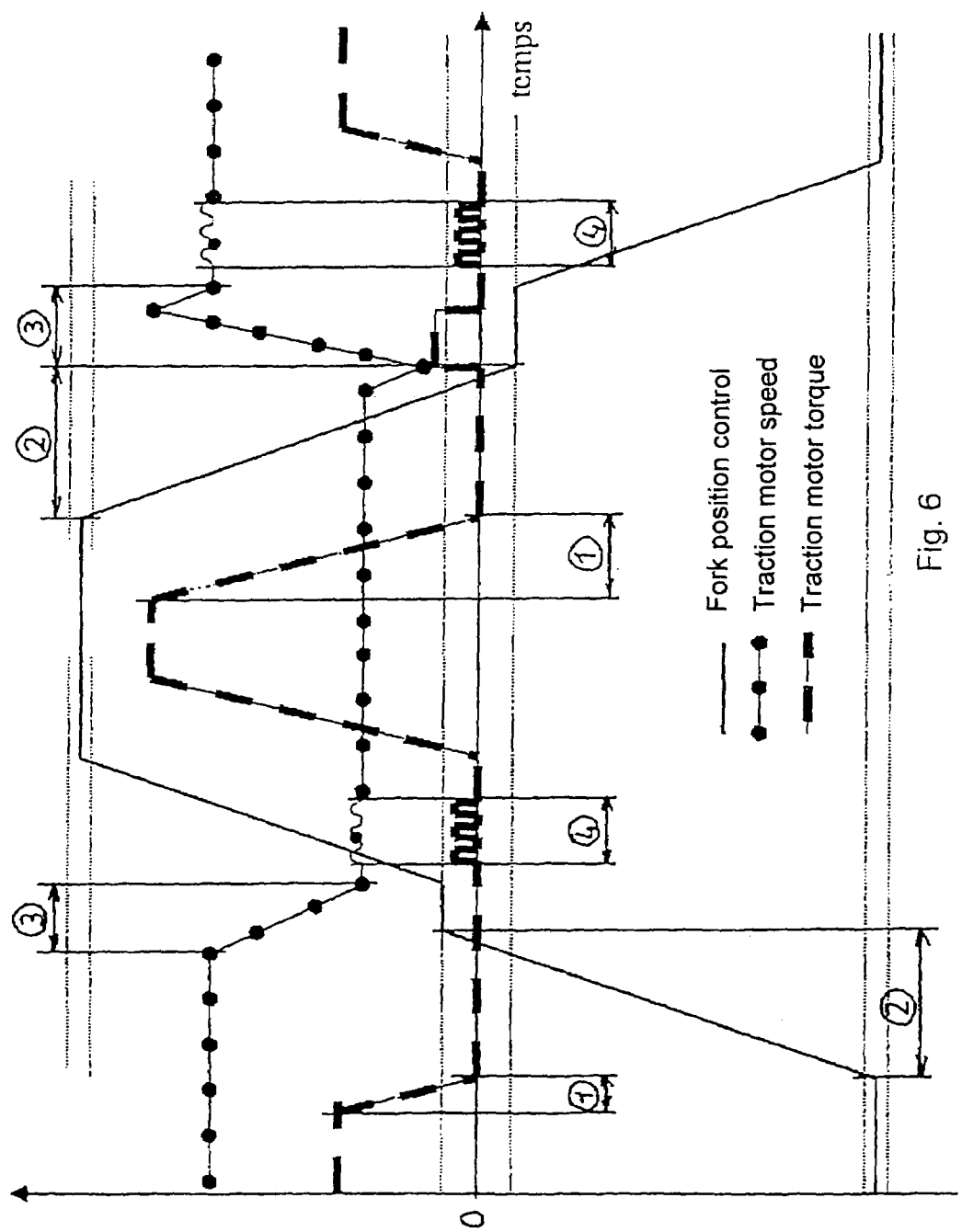
FIG. 6 is a chronogram showing the changes over time during the gear changes, of the position of the control fork, the speed of the traction motor and the torque of the traction motor.

The chronogram shown in FIG. 6 illustrates the sequence of operations. Whatever the direction of the gear ratio change, and whichever the sequence of gears concerned, a gear ratio change entails annulling the motor torque (zone 1), moving the gearbox to the neutral position (zone 2), and then adjusting the motor's rotation speed to the level that corresponds to the future ratio selected (zone 3), so as to be able to engage the said ratio mechanically before the motor is again controlled to give the torque desired.

The chronogram of FIG. 6 also shows preferred details of embodiments not to be construed as limiting. To facilitate the gear ratio change, careful control of the motor can produce small speed oscillations (zone 4) whose purpose is to favor the engagement of the dog clutches during that of the next gear ratio. Note that the torque and speed variations involved are very small: the torque variation shown in zone 4 serves only to accelerate the rotor of the motor M against its own inertia; the resulting speed variation itself is very small, the more so because it is immediately limited by the beginning of the dog clutch's engagement (take-up of the functional clearances). The torque and speed variations shown in zone 4 should not be compared with those shown in the other zones, since the drawing is purely schematic.

Preferably, and if the driving conditions so permit, the torque of the electric traction motors should be controlled such that just before disengaging a gear ratio and just after having engaged another gear ratio, the torque on the wheel should be essentially equivalent. If one is moving towards a larger total reduction ratio (changing from second to first), this entails voluntarily limiting the torque of the electric motor just after the gear ratio change maneuver. The torque is reduced essentially in the ratio R. Moving towards a smaller total reduction ratio (changing from first to second) entails voluntarily increasing the electric torque just after the gear ratio change maneuver. The torque is increased essentially in the ratio R. Now, the motor torque available is necessarily limited to a value Cmax. If the desired torque increase would lead to a value higher than Cmax, it is appropriate, before the gear ratio change maneuver, to reduce the torque to a value less than or equal to Cmax/R so that after the gear ratio change maneuver, the torque applied does not exceed Cmax.

Note also that during a gear shift to a ratio with lower total reduction ratio, the electric motor must change as quickly as possible to a lower speed as soon as the gearbox is in the neutral position. The motor must then be electrically braked, which entails being able to absorb the electrical energy in some other way (for example dissipation in resistances or recharging storage elements).

The invention makes it possible:
- in $1^{st}$ gear (high reduction ratio), to benefit from a large torque on the wheel, giving a high dynamic performance;
- in $2^{nd}$ gear (lower reduction ratio), to allow the vehicle's maximum design speed to be reached;
- in certain cases, to envisage vehicles with 2 drive wheels instead of 4, by increasing the starting torque (so reducing the equipment fitted, and therefore the mass and the cost).

We will now consider some particular cases of the invention's implementation. Below, the use of the traction chain according to the invention in a four-wheeled vehicle is considered, but this is in no way limiting. Such a vehicle is assumed to have at least two drive wheels and therefore two traction chains and two electric traction motors, each of the latter being connected to the input shaft of each of the traction chains. The purpose intended is always to carry out the operation of changing gear by using only the sensors proposed above; the objective of these particular embodiments is therefore to avoid incorporating a wheel speed sensor downstream from the gear change mechanism.

The vehicle can have two or four drive wheels. Overall control of the vehicle is effected by a central computing unit called the "CU" . The computing unit uses any appropriate algorithm, to determine a suitable moment for carrying out the gear change. The computing unit has some information at its disposal:
- sensors: accelerator pedal position, brake pedal position or pressure, steering-wheel position, gas valve position and combustion engine speed (if the vehicle is equipped with a combustion engine);
- information from the traction electronics: motor speeds, gear ratios currently engaged; these informations are updated regularly (for example, every 10 ins) via a CAN (~) bus or similar bus. From these informations, the computing unit can then calculate the speed of each wheel.

The gear change itself is effected by a single electronic aggregate which controls the two electric traction motors on one axle and the gear change mechanism in both wheels on that axle (or, in case of two drive axles, there may be two electronic aggregates, each of which controls the elements of one axle). This electronic aggregate receives a gear ratio change command from the CU and, after its execution, returns a confirmation.

It will be recalled that during the phase of changing gear ratio, it is desired to know the speed of the wheel considered while avoiding the use of a speed sensor in that wheel. When a gear ratio is engaged, the wheel's speed is given by that of the corresponding traction motor. Unfortunately, the speed of the wheel is needed during a phase when the gear ratio change mechanism is in neutral. During that phase, the wheel speed cannot be deduced from the motor speed information.

In the sequence of operations for changing gear ratio, provision is made, after moving into neutral, to readjust the rotation speed of the traction motor to a level compatible with the speed of the wheel when the traction chain engages the gear ratio which is selected. This then entails knowing the wheel speed even during the gear ratio change phase.

When a gear ratio is engaged, the speed of the vehicle can be determined by the combined use of the following sensors:
- the position sensor PS1 integrated in the brushless synchronous electric motor,
- the position sensors 21 fitted to the gear ratio change device (gearbox in direct engagement or in the reduction position).

The time to carry out the gear ratio change, described above as quasi-instantaneous, is approximately 300 ms. In a first particular embodiment variant, if this time is respected the speed of the vehicle during the gear ratio change is assumed to be constant. The vehicle speed to be taken into account during the gear ratio change is therefore the last value calculated before the beginning of the gear ratio change operation. To demonstrate that this approximation is acceptable, consider the actual speed variation assuming a moderate acceleration (or deceleration) of 3 m/s². For a gear change maneuver lasting 300 ms, a speed variation amounting to 3*0.3=0.9 m/s or about 3 km/h will take place. It is clear that this approximation remains valid for moderate accelerations or decelerations and provided that the gear ratio change time is respected.

The gear ratio change control system carries out the following operations, for example when changing from $1^{st}$ to $2^{nd}$:
- check that $1^{st}$ gear is engaged;
- calculation of the wheel speed from the "traction motor speed" and "$1^{st}$ gear engaged"data;
- motor torque brought to zero;
- movement into neutral;
- motor speed readjusted on the basis of the wheel speed calculated above;
- $2^{nd}$ gear engaged;
- check that $2^{nd}$ gear is engaged;
- restoration of the motor torque.

In other particular variant embodiments indicated below, gear ratio change control systems are proposed which are valid even if the "constant speed" approximation described above does not hold good.

In the case of a vehicle with four drive wheels, the gear ratio changes at the two axles can be offset in time: gear ratio change at one axle first, then gear ratio change at the other axle. During the gear ratio change at the first axle, the speed of the wheels concerned by the gear ratio change is calculated by the computing unit from the traction motor speed and the current gear ratio at the other axle, the wheel(s) of said other axle then playing the part of so-termed "sensor wheels". The speeds of the wheels in question are transmitted by the CAN® bus to the control electronics of the first axle, the one with wheels termed "maneuvered wheels". This is then repeated, changing the axle for the roles of sensor wheels and maneuvered wheels.

It is essential to have access to reliable vehicle speed information. If, just before the gear ratio change command is issued or during the gear ratio change itself, the computing unit detects that one of the two sensor wheels is in an abnormal situation (locked or skidding), the vehicle speed information is worked out from the other wheel on the same axle. If both wheels on the axle carrying the sensor wheels are in an abnormal situation (locked or skidding) just before the gear ratio change command is emitted, the gear ratio change command will not be sent until the situation returns to normal. If the abnormal situation (locking or skidding) of both wheels on the sensor wheel axle occurs while the gear ratio change process is taking place at the other axle, the computing unit emits as the "vehicle speed" datum the last calculated information which is deemed reliable. Another possible solution is the following: to remain in neutral at the wheels undergoing the gear ratio change until the speed given by the sensor wheel(s) is again reliable.

For a vehicle with two drive wheels, the gear ratio changes at the two wheels can be offset in time: for example, gear ratio change in the left wheel first, and then gear ratio change in the right wheel. During the gear ratio change in the left wheel (the maneuvered wheel), the vehicle speed is calculated locally by the traction electronics from the traction motor speed and the current gear ratio in the right wheel (sensor wheel), and conversely.

In a manner analogous to that explained above, if, just before the gear ratio change command is emitted, the computing unit detects that the sensor wheel is in an abnormal situation (locked or skidding), the gear ratio change command is not sent until a normal situation has been restored. If the abnormal situation (locking or skidding) of the sensor wheel occurs while the gear ratio change process is taking place in the other wheel, the datum used for the vehicle speed is the last one calculated that can be relied upon. Here too, another possible solution is as follows: to remain in neutral at the wheel undergoing the gear ratio change until the vehicle speed given by the sensor wheel has become reliable again.

In all cases, if a wheel becomes locked (very sharp braking) during its own gear ratio change and more particularly when the gearbox is in neutral, the traction motor and wheel speeds are no longer compatible so as to enable the new gear ratio to be engaged. This situation cannot be detected because the wheel is mechanically uncoupled from the motor; there may be a risk of mechanical failure in the system. This situation can be avoided if the gear ratio change process is blocked in the event of very violent braking, itself detected via the braking pressure, via the depression speed of the braking pedal or via a measurement of the longitudinal acceleration.

In summary, the invention proposes a process for controlling gear ratio changes in a vehicle with at least two drive wheels, each provided with a traction chain like that described above, in which the gear ratio changes at the two drive wheels are offset in time: in an initial phase the gear ratio change takes place in a wheel said to be "maneuvered", the vehicle speed being calculated by the traction electronics from information about the traction motor speed and the current gear ratio in the other wheel, said to be the "sensor wheel", and then, in a subsequent phase, the gear ratio change takes place in said other wheel. For a vehicle with at least four drive wheels on two axles, at least one sensor wheel is located on one of the axles and the maneuvered wheels are on the other axle during the said initial phase, and the positions of the "sensor" and "maneuvered" wheels are inverted during the subsequent phase.

The invention claimed is:

1. Traction chain for an automobile vehicle, comprising:
a wheel support which carries a rotating hub designed to receive a drive wheel and having a rotation axis for the drive wheel,
a rotating toothed wheel having a rotation axis the same as that of the drive wheel, the toothed wheel meshing directly with the hub, and
an arrangement comprising at least two gear-wheels which are permanently meshed with the toothed wheel, an input shaft designed to be coupled with a shaft of an electric motor, and a gear ratio change shifter mechanism shiftable between:
a first driving position in which the shifter mechanism directly connects the input shaft with one of the gear-wheels for rotation therewith about a common axis of the input shaft,
a second driving position in which the shifter mechanism indirectly connects the input shaft with another gear-wheel through a mechanical transmission path establishing a gear reduction ratio different from a gear ratio established in the first driving position, and
a neutral non-driving position.

2. Traction chain according to claim 1, in which the gear ratio change shifter mechanism comprises a dog clutch slidable along a common axis of rotation of the input shaft and the one gear wheel.

3. Traction chain according to claim 2, in which in the other second driving state position the dog clutch rotates the other gear-wheel via an intermediate gear-wheel which causes the rotation speed to be inverted.

4. Traction chain according to claim 2, in which in the first driving position, the dog clutch moves the one gear-wheel at a 1:1 ratio directly without any intermediate gear-wheel.

5. Traction chain according to claim 1, which has no friction clutch.

6. Traction chain according to claim 1, in which the gear ratio shifter mechanism is shiftable between only two gear ratios.

7. Traction chain according to claim 1, which comprises an electric synchronous motor, having at least one integrated rotor position sensor used to control the motor.

8. Traction chain according to claim 7, in which the only sensors used to determine the wheel rotation speed are the position sensor integrated in the motor and a position sensor associated with the gear ratio change mechanism.

9. Traction chain for an automobile vehicle, comprising:
a wheel support which carries a rotating hub designed to receive a drive wheel and having a rotation axis for the drive wheel,
a rotating toothed wheel having a rotation axis the same as that of the drive wheel, the toothed wheel meshing directly with the hub,
a synchronous, self-adjusting electric motor comprising at least one integrated rotor position sensor used to control the motor, and
an arrangement comprising at least two gear-wheels permanently meshed with said toothed wheel, an input shaft coupled with a shaft of the electric motor, and a gear ratio change mechanism with a neutral position between gear ratios, the mechanism selectively producing engagement between the input shaft and one or the other of the gear-wheels, the said mechanism comprising, between the input shaft and the other gear-wheel, at least one other mechanical transmission path with a reduction ratio different from a gear ratio of the engagement between the input shaft and the one gear wheel, wherein the only sensors used to determine the wheel rotation speed are the at least one position sensor integrated in the motor and a sensor associated with the gear ratio change mechanism.

* * * * *